US008356667B2

(12) United States Patent
Quintero et al.

(10) Patent No.: US 8,356,667 B2
(45) Date of Patent: Jan. 22, 2013

(54) LIQUID CRYSTALS FOR DRILLING, COMPLETION AND PRODUCTION FLUIDS

(75) Inventors: Lirio Quintero, Houston, TX (US); David E. Clark, Humble, TX (US); Antonio Enrique Cardenas, Houston, TX (US); Hartley H. Downs, Jasper, TX (US); Christopher T. Gallagher, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 280 days.

(21) Appl. No.: 12/780,591

(22) Filed: May 14, 2010

(65) Prior Publication Data
US 2010/0314118 A1 Dec. 16, 2010

Related U.S. Application Data

(60) Provisional application No. 61/186,651, filed on Jun. 12, 2009.

(51) Int. Cl.
*E21B 43/22* (2006.01)
(52) U.S. Cl. ............... 166/300; 166/293; 166/305.1; 166/308.1; 175/72
(58) Field of Classification Search .................. None
See application file for complete search history.

(56) References Cited

U.S. PATENT DOCUMENTS

| | | | |
|---|---|---|---|
| 3,954,627 A | | 5/1976 | Dreher et al. |
| 4,434,062 A | | 2/1984 | Oswald et al. |
| 5,807,810 A | | 9/1998 | Blezard et al. |
| 5,919,738 A | | 7/1999 | Norfleet et al. |
| 5,964,692 A | | 10/1999 | Blezard et al. |
| 6,100,221 A | * | 8/2000 | Poelker et al. ........... 507/90 |
| 6,130,190 A | | 10/2000 | Gunsel et al. |
| 6,166,095 A | | 12/2000 | Bryan et al. |
| 6,331,508 B1 | * | 12/2001 | Pakulski ................. 507/90 |
| 7,144,844 B2 | | 12/2006 | Qu et al. |
| 7,151,077 B2 | | 12/2006 | Prud'homme et al. |
| 7,196,040 B2 | | 3/2007 | Heath et al. |
| 7,316,789 B2 | | 1/2008 | Lu |
| 2002/0195739 A1 | | 12/2002 | Bagley et al. |
| 2009/0183877 A1 | | 7/2009 | Quintero et al. |
| 2010/0137168 A1 | * | 6/2010 | Quintero et al. ........ 507/124 |

FOREIGN PATENT DOCUMENTS

WO 2005090851 A1 9/2005

OTHER PUBLICATIONS

E. Friberg et al, "A Non-aqueous Microemulsion", Colloid & Polymer Sci. 262, 252-253 (1984).
Paz, L., Di Meglio J. M., Dvolaitzky, M., Ober, R., Taupin C., "Highly Curved Defect in Lyotropic (Nonionic) Lamellar Phases. Origin and Role in Hydration Process", The Journal of Physic Chemistry, 88 (16),3415-3418, 1984.
Kunieda et al., "Self-Organizing Structures in Poly (oxyethylene) Oleyl Ether—Water System" J. Phys. Chem. B 1997, 101, 7952-7957.
P. Alexandridis, et al., "A Record Nine Different Phases (Four Cubic, Two Hexagonal, and One Lamellar Lyotropic Liquid Crystalline and Two Micellar Solutions) in a Ternary Isothermal System of an Amphiphilic Block Copolymer and Selective Solvents (Water and Oil)," Langmuir, 1998, vol. 14, pp. 2627-2638.
C. J. Drummond, et al., "Surfactant Self-Assembly Objects as Novel Drug Delivery Vehicles," Current Opinion in Colloid & Interface Science, 2000, vol. 4, pp. 449-456.
P. T. Spicer, et al., "Novel Process for Producing Cubic Liquid Crystalline Nanoparticles (Cubosomes)," Langmuir, 2001, vol. 17, pp. 5748-5756.
Forgiarini et al., "Formation of Nano-emulsions by Low-Energy Emulsification Methods at Constant Temperature" Langmuir 2001, 17, 2076-2083.
Berni, M.G, Lawrence, C.J, Machin, D., "A review of the rheology of the lamellar phase in surfactant systems;" Advances in Colloid and Interface Science, 98, 217-243 (2002).
V. A. Davis, et al., in "Phase Behavior and Rheology of SWNTs in Superacids," Macromolecules, 2004, vol. 37, pp. 154-160.
Dierking, I, Scalia, G. and Morales, P "Liquid crystal—carbon nanotube dispersions", Journal of Applied Physics 97, 044309 (2005).
I.M. Saez and J.M. Goodby, "Supramolecular liquid crystals", J. Mater. Chem., 2005, 15, 26-40.
T. Kato, et al., "Functional Liquid-Crystalline Assemblies: Self-Organized Soft Materials," Angew. Chem. Int. Ed. 2006, vol. 45, pp. 38-68.
Friberg, S.E., Weight fractions in three phase emulsions with an LIN phase. Colloids and Surfaces A: Physicochem. And Engineering Aspects, 282283, 369-376 (2006).
C. Zakri, et al., "Phase Behavior of Nanotube Suspensions: From Attraction Induced Percolation to Liquid Crystalline Phases," Journal of Materials Chemistry, 2006, vol. 16, pp. 4095-4098.
P. Palffy-Muhoray, "Orientationally Ordered Soft Matter: The Diverse World of Liquid Crystals," Liquid Crystal Communications, Aug. 26, 2007 available at http://www.e-lc.org/docs/2007_08_26_01_36_22.

(Continued)

*Primary Examiner* — Zakiya W Bates
(74) *Attorney, Agent, or Firm* — Mossman Kumar & Tyler PC

(57) ABSTRACT

Fluids containing liquid crystal-forming surfactants or polymeric surfactants, or polymers, or complex polymers or copolymers, or graphite nanotubes or Janus particles in a polar and/or non polar liquid, and optionally, co-surfactants, are useful in drilling, completion and production operations to give increased viscosity (solids suspension ability) and/or decreased fluid loss, as compared to otherwise identical fluids absent the liquid crystals. These liquid crystal compositions contain organized micelles. The liquid crystal-containing fluids are useful in completion fluids, fracturing fluids, formation damage remediation, waste management, lost circulation, drilling optimization, reducing trapped annular pressure during the hydrocarbon production process, well strengthening, friction and drag reducers, fluids introduced through an injection well, for geothermal wells, and the controlled release of additives into a wellbore, at a subterranean formation or at the oil production facilities.

23 Claims, 5 Drawing Sheets

OTHER PUBLICATIONS

J. W. Goodby, et al., "Transmission and Amplification of Information and Properties in Nanostructured Liquid Crystals," Angew. Chem. Int. Ed. 2008, vol. 47, pp. 2754-2787.

J. Salager, "Microemulsions" Reprinted from Handbook of Detergents—Part A: Properties, G. Broze Ed., Surfactant Science Series, vol. 82, Chapter 8, pp. 253-302 (1999).

Y. Wu, et al., "A Study of Branched Alcohol Propoxylate Sulfate Surfactants for Improved Oil Recovery," SPE Annual Technical Conference and Exhibition, Dallas, TX, SPE 95404, pp. 1-10, Oct. 9-12, 2005.

Y. Wu, et al., "A Study of Wetting Behavior and Surfactant EOR in Carbonates With Model Compounds," SPE/DOE Symposium on Improved Oil Recovery, Tulsa, OK, SPE 99612, pp. 1-11, Apr. 22-26, 2006.

Fraunhofer-Gesellschaft, "Almost Frictionless Gears With Liquid Crystal Lubricants," ScienceDaily, 2 pp., Nov. 11, 2008.

Nematel GmbH & Co. KG, http://www.nematel.com/index.html, last update Sep. 12, 2008.

* cited by examiner

LIQUID CRYSTALS FOR DRILLING, COMPLETION AND PRODUCTION FLUIDS

CROSS-REFERENCE TO RELATED APPLICATION

This application claims the benefit of U.S. Provisional Patent Application No. 61/186,651 filed Jun. 12, 2009.

TECHNICAL FIELD

The present invention relates to methods and compositions for conducting operations in wellbores and/or subterranean formations, reservoirs, and hydrocarbon production facilities and more particularly relates, in one non-limiting embodiment, to conducting operations in wellbores and/or subterranean formations, reservoirs, geothermal wells and hydrocarbon production facilities using fluids containing liquid crystals.

BACKGROUND

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds". The functions of a drilling fluid include, but are not necessarily limited to, cooling and lubricating the bit, lubricating the drill pipe, carrying the cuttings and other materials from the hole to the surface, and exerting a hydrostatic pressure against the borehole wall to prevent the flow of fluids from the surrounding formation into the borehole.

Drilling fluids are typically classified according to their base fluid. In water-based muds, solid particles are suspended in water or brine. Oil can be emulsified in the water which is the continuous phase. Brine-based drilling fluids, of course are a water-based mud (WBM) in which the aqueous component is brine. Oil-based muds (OBM) are the opposite or inverse. Solid particles are suspended in oil, and water or brine is emulsified in the oil and therefore the oil is the continuous phase. Oil-based muds can be either all-oil based or water-in-oil macroemulsions, which are also called invert emulsions. In oil-based mud, the oil may consist of any oil that may include, but is not limited to, diesel, mineral oil, esters, or alpha-olefins. OBMs as defined herein also include synthetic-based fluids or muds (SBMs) which are synthetically produced rather than refined from naturally-occurring materials. SBMs often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these types. OBMs and SBMs are also sometimes collectively referred to as "non-aqueous fluids" (NAFs).

Damage to a reservoir is particularly harmful if it occurs while drilling through the pay zone or the zone believed to hold recoverable oil or gas. In order to avoid such damage, a different fluid—known as a "drill-in" fluid—may be pumped through the drill pipe while drilling through the pay zone.

Another type of fluid used in oil and gas wells is a completion fluid. A completion fluid is pumped down a well after drilling operations are completed and during the completion phase. Drilling mud typically is removed or displaced from the well using a completion fluid, which may be a clear brine. Then, the equipment required to produce fluids to the surface is installed in the well. A completion fluid must have sufficient density to maintain a differential pressure with the wellbore, which controls the well and to maintain the filter cake. The completion fluid must have sufficient viscosity and elasticity to maintain a suspension of bridging or weighting agents. The viscosity of a completion brine typically is maintained using polymers, such as starches, derivatized starches, gums, derivatized gums, and cellulosics. Unfortunately, although these polymers are water-soluble, they have a relatively low hydration rate in brines because very little water actually is available to hydrate the polymers in highly saline brines. Hydrating the polymers can be time consuming and expensive. Less time consuming and expensive methods for hydrating polymers in highly saline brines are greatly needed. Also needed are methods which will entirely eliminate the need to add these water soluble polymers to drilling and completion fluids. Formation damage often occurs when these polymers are removed from the wellbore, particularly if they have formed a filter cake on the wellbore that has infiltrated the adjacent formation.

Formation damage involves undesirable alteration of the initial characteristics of a producing formation, typically by exposure to drilling fluids. The water or solid particles in the drilling fluids, or both, tend to decrease the pore volume and effective permeability of the producible formation in the near-wellbore region. There may be at least three possible mechanisms at work. First, solid particles from the drilling fluid may physically plug or bridge across flowpaths in the porous formation. Second, when water contacts certain clay mineral in the formation, the clay typically swells, thus increasing in volume and in turn decreasing the pore volume. Third, chemical reactions between the drilling fluid and the formation rock and fluids may precipitate solids or semisolids that plug pore spaces.

Reduced hydrocarbon production can result from reservoir damage when a drilling mud deeply invades the subterranean reservoir. It will also be understood that the drilling fluid, e.g. oil-based mud, is deposited and concentrated at the borehole face and partially inside the formation. Many operators are interested in improving formation clean up and removing the cake or plugging material and/or improving formation damage after drilling into reservoirs with oil-based muds.

Limited hydrocarbon production may be increased by the creation of hydraulic fractures using fluids that transmit hydraulic pressure to the rock to induce fractures in the formation. Increased productivity through fractures is achieved by extending the area available for the hydrocarbon to flow to the well bore. Fractures are propped open by sand transported into the fracture during its creation by the fracturing fluid or by pumping high permeability proppant, relative to the formation permeability. When the applied pump rates and pressures are reduced or removed from the formation, closure of the fracture is prevented because the high permeability proppant maintains the fracture open. Fracturing fluids have been used for hydraulic fracturing since they maintain low formation-damage characteristics and have required rheological properties. However, fracturing fluids tend to have high fluid leakoff into the reservoir matrix which reduces the efficiency of the fluid during fracturing operations; therefore conventionally fluid loss agents have to be used for fracturing treatment.

It would be advantageous to improve the ability of drilling fluids, drill-in fluids, completion fluids and the like, to suspend solids while reducing or eliminating the presence of polymers to do the same. It would further be helpful to improve the fluid loss control of the fluids described, that is reduce, prevent or otherwise inhibit the unintentional and undesired loss of these fluids into a subterranean formation.

It would be desirable as well to provide a fluid that may be used as fracturing fluid without the addition of any fluid loss control agent. There is also a significant need for a lubricant fluid or lubricant additive for drilling fluids to reduce friction and increase lubricity. It would be as well desirable if compositions and methods could be devised to aid and improve the ability to clean up damage and difficulties caused to the wellbore and the formation. It may also be desirable to have a fluid with the capability of in-situ water shut-off by hydrating and swelling when contacting an aqueous phase, preventing water to flow.

SUMMARY

There is provided, in one non-limiting form, a method of conducting an operation in a wellbore, subterranean formation, oil production facilities and/or geothermal wells. The method involves introducing a liquid crystal-containing fluid into the wellbore and/or subterranean formation. The fluid comprising the liquid crystals may have either pre-formed liquid crystals, self-responsive liquid crystals or in situ liquid crystal-forming components. In the latter case, the method further involves forming liquid crystals in situ adjacent the wellbore and/or the subterranean formation. Self-responsive liquid crystals result in a change in phase, molecular shape, structure or properties of the system. The liquid crystal forms are affected by stimuli and type of materials. The stimuli include, but are not necessarily limited to, pressure, temperature, changes in ion concentration in the surrounding environment, pH, salinity, and electric field and/or magnetic field. For instance, in the latter case, LCs may be engineered on a molecular level so that their structures or organization may be switched by electric or magnetic fields. Some materials may be ferroelectric, in that they contain iron. Suitable materials or "liquid crystal forming material" may include, but are not necessarily limited to, surfactants, hydrogels, polymeric surfactants, amphiphilic polymers, polymers, copolymers, graphite nano tubes, carbon nano tube, lipids, proteins and Janus molecules and particles. The fluid includes an aqueous phase, or a non-aqueous phase or both aqueous and non-aqueous phases, and a liquid crystal-forming component that is at least one surfactant and/or polymers and/or copolymers and/or nano particles such as, but not limited to single or multi wall nanotubes. The aqueous phase and the non-aqueous phase may already be present in the wellbore and/or the subterranean formation or may be introduced into the wellbore and/or the subterranean formation before, after or during introduction of the liquid crystal-forming component. The method additionally involves at least one further action including, but not necessarily limited to, circulating the fluid in the wellbore, fracturing the subterranean formation, removing damage and/or solids from the wellbore and/or subterranean formation, drilling the wellbore, reducing trapped annular pressure during the hydrocarbon production process, releasing an additive into a wellbore, reducing fluid loss into the formation, selectively gelling an oil layer in oil/water mixtures, reducing the production of water relative to the production of hydrocarbon, modifying the rheology of the fluid, reducing the drag of the fluid, lubricating moving equipment in the wellbore, removing heat from the wellbore; crosslinking components of loss circulation pills; reversing an emulsifier with a magnetic field; increasing rate of penetration by response of the fluid to an electric field or magnetic field at a drill bit; dispersing nanoparticles; strengthening the wellbore, improving the properties of cement in the wellbore, and delivering a fluid or solid additive into the wellbore or subterranean formation.

DETAILED DESCRIPTION

Figure 1:
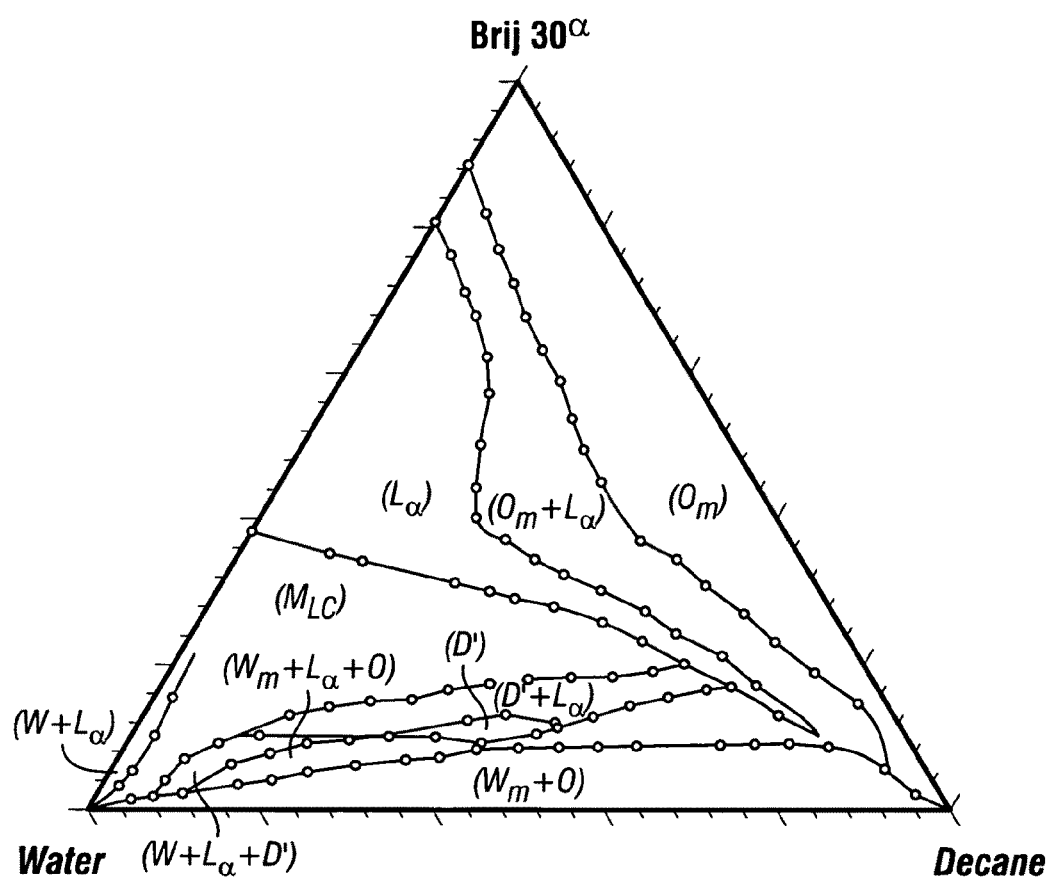
FIG. 1 is a phase diagram of a surfactant-water-oil system showing liquid crystal, microemulsions and liquid phases.

It has been discovered that fluids containing liquid crystals (LCs) can increase the ability of those fluids to suspend solids, for instance, suspending proppants in a fracturing fluid or cuttings in a drilling fluid, and additionally or alternatively help control loss of that fluid from the wellbore into a subterranean formation undesirably. It has been also discovered that fluid containing liquid crystals increase the lubricity and therefore reduce the torque and energy requirements in the rotating drill pipe during the drilling operations and increase the efficiency and life of drilling motors, drill bits and downhole pumps. Liquid crystals may be also used for encapsulating and controlled release of additives, such as production additives, to improve performance and efficiency in downhole operations and upstream or oil production facilities; to form an effective membrane rock sealing, to improve the well strengthening and reduce the wellbore stability problems; to stabilize emulsions and break emulsions; to form a fluid containing liquid crystals for water-wetting of casing and rock formation to improve cement bonding. Liquid crystals may also be designed to change conductivity and act as a switch in down hole tools.

These liquid crystal compositions may contain, but are not limited to organized hexagonal, cubic, or lamellar micelles. Lamellar and hexagonal micelles are birefringent. Birefringence refers to the decomposing of a ray of light into two distinct different rays. Suitable liquid crystals may comprise but are not necessarily limited to nematic liquid crystal, smectic liquid crystal, lyotropic liquid crystal, thermotropic liquid crystal, chromonic liquid crystal, polymeric liquid crystal, cholesteric liquid crystal, ferroelectric liquid crystal, frustrated liquid crystal, columnar liquid crystal, nematic discotic liquid crystal, calamitic nematic liquid crystal, or discoid liquid crystal.

Liquid crystals are well-known substances that exhibit a state of matter that has properties between those of a conventional liquid, and those of a solid crystal. For instance, a liquid crystal (LC) may flow like a liquid, but its molecules may be oriented in a crystal-like way. There are many different types of LC phases, which can be distinguished based on their different optical properties (such as birefringence). When viewed under a microscope using a polarized light source, different liquid crystal phases will appear to have a distinct pattern or texture. The contrasting areas in the texture each correspond to a domain where the LC molecules are oriented in a different direction. Within a domain, however, the molecules are well ordered. LC materials may not always be in an LC phase. The name notwithstanding, liquid crystals are not crystals and they are not necessarily liquids. They are systems whose components possess long range orientational, but not positional order. One possibly more correct name is orientionally ordered soft matter. The liquid crystals may be self-organized, or may be organized by an outside influence, such as an applied electric field or temperature. In one non-limiting explanation, the LCs of the fluids described herein are self-organized and/or organized under the relatively high temperature conditions that exist within a wellbore and/or subterranean formation.

The flow behavior and rheology of colloidal dispersions are of paramount importance in several applications, for example colloidal clay particles find applications in oilfield drilling fluids. Because of the organization or ordering of the liquid crystals, the viscosity of the fluid in which they are suspended or otherwise present is increased, thus increasing their ability to suspend solids such as drill cuttings or proppants or the like. Such increase in viscosity may also help inhibit or prevent the fluids bearing the liquid crystals from undesirably leaking into subterranean formation or zone. The inclusion of nano particles into liquid crystals is a way of modifying the rheological properties of these systems. The variations of the rheological properties are due to distortions of the solvent and to the resultant topological defects and elastic interactions.

The organized alignment of molecules in a liquid crystal may be designed to result in a preferred alignment that will result good lubricating properties for the fluid used while conducting operations in wellbores and/or subterranean formations and reservoirs. The formation of ordered fluid films is the basis for the use of liquid crystals in lubrication. Although different from the methods described herein, the lubricating properties of liquid crystals are reported in U.S. Pat. No. 6,130,190, incorporated herein by reference in its entirety.

The overall structure of liquid crystals may also help contain, confine or otherwise "bind up" certain additives within the liquid crystal orientational structure. These additives may subsequently be delivered in production pipelines or downhole or at or in a subterranean formation when the LC is disordered or randomized, thus permitting the additive to be released and/or relatively more free to move and contact the production fluid, wellbore or subterranean formation or even geothermal well to treat it in some way. The structure of liquid crystals may also help contain, confine or otherwise "bind up" a functional group that acts as a sensor to retrieve information at the drill bit or near the wellbore zone. Further, liquid crystals may act as sensors since their orientational behavior may be influenced by the structure of neighbor contacting species The liquid crystal nanostructure can be designed to be stimuli responsive that may be reversed to allow changes to the nanostructure in response to external changes such as but not limited to temperature, pressure, pH, salinity, changes in ion concentration, electricity, magnetism and combinations of these so the system can be used as a delivery vehicle for "on demand" additive release. Such additives include, but are not necessarily limited to, wax and asphaltene inhibitors, shale stabilizers, corrosion inhibitors, rate of penetration (ROP) enhancers, scale inhibitors, hydrate inhibitors, biocides, lubricants, additives for acid treatment, cross linking agents, chemicals to treat acid gases and the like. In one non-limiting embodiment the controlled release may involve solubilizing the material to be released into the LC phase (in a non-restrictive embodiment a cubic gel which provides a matrix for the material, alternatively a hexagonal phase may be used) and then diffusing the additive out from the liquid crystals in a controlled manner. Further details may be found in P. T. SPICER, et al., "Novel Process for Producing Cubic Liquid Crystalline Nanoparticles (Cubosomes)," *Langmuir,* 2001, Vol. 17, pp. 5748-5756, incorporated herein by reference in its entirety. The release profile of these structures and methods depend on the diffusion constant, solubility, and partition coefficient of the material (additive) to be released and matrix related factors such as geometry, porosity, and tortuosity of the LC phase, for instance as described in C. J. DRUMMOND, et al., "Surfactant Self-Assembly Objects as Novel Drug Delivery Vehicles," Current Opinion in Colloid & Interface Science, 2000, Vol. 4, pp. 449-456 also incorporated by reference herein in its entirety. However, the inventors do not wish to be limited to any particular theory.

Further details about liquid crystals may be found in the following articles, all of which are incorporated herein by reference in their entirety: P. Palffy-Muhoray, "Orientationally Ordered Soft Matter: The Diverse World of Liquid Crystals," *Liquid Crystal Communications*, Aug. 26, 2007 available at http://www.e-lc.org/docs/2007_08_26_01_36_22; T. Kato, et al., "Functional Liquid-Crystalline Assemblies: Self-Organized Soft Materials," *Angew. Chem. Int. Ed.* 2006, Vol. 45, pp. 38-68; J. W. Goodby, et al., "Transmission and Amplification of Information and Properties in Nanostructured Liquid Crystals," *Angew. Chem. Int. Ed.* 2008, Vol. 47, pp. 2754-2787; I. M. Saez and J. M. Goodby, "Supramolecular liquid crystals", *J. Mater. Chem.,* 2005, 15, 26-40, and P. Alexandridis, et al., "A Record Nine Different Phases (Four Cubic, Two Hexagonal, and One Lamellar Lyotropic Liquid Crystalline and Two Micellar Solutions) in a Ternary Isothermal System of an Amphiphilic Block Copolymer and Selective Solvents (Water and Oil)," *Langmuir,* 1998, Vol. 14, pp. 2627-2638. In particular, the Kato, et al. article describes the molecular organization of liquid crystals, such as liquid-crystalline physical gels as composites of liquid crystals and self-assembled solid fibers, as well as supramolecular self-assembly driven by hydrogen bonding. Liquid crystals may be build by various types of molecular interactions including but not limited to hydrogen bonding, charge transfer and ionic bonding, to form complex functional and mechanical structures that respond to external stimuli, resulting in changes of the shape, size and properties of the material The liquid crystal structures have an effect on their functions and properties including, but not necessarily limited to, conductivity, ion transport, optics and catalysis. The Saez and Goodby, and the Goodby et al. articles explain the potential of precise control of functionality and molecular architecture in the molecular engineering of liquid crystals for creating functional materials. These so-called supramolecular materials self-organize depending on simple structural features related to the mesogenic units attached to the periphery of a central scaffold such as their density, orientation of attachment and degree to which they are decouple to the central structure or scaffold. The manipulation of the structure of these supramolecular liquid crystals allows selection of mesophase type and therefore of the physical properties for the specific application. These supramolecules include the so-called Janus like liquid crystals which have diversely functionalized faces and self organize in a pre-programmed fashion. Depending on the characteristics of the liquid crystal forming material attached to the central scaffold these Janus like liquid crystals may be used in a non-limited embodiment as magnetic reversible emulsifiers.

Somewhat surprisingly, it has been found that nanotubes, specifically carbon nanotubes, exhibit liquid crystal behavior under certain conditions. This behavior may occur when the nanotubes are stabilized in water by using a surfactant, in one non-limiting instance, sodium dodecyl sulfate (SDS). Other surfactants may be used which will be described below. These stabilized nanotubes are described in C. Zakri, et al., "Phase Behavior of Nanotube Suspensions: From Attraction Induced Percolation to Liquid Crystalline Phases," *Journal of Materials Chemistry,* 2006, Vol. 16, pp. 4095-4098, incorporated herein by reference in its entirety. Another approach involves dispersing nanotubes in superacids, e.g. sulfuric acid with various levels of excess $SO_3$, chlorosulfonic acid and triflic acid. Concentrations up to 10 wt % without the need for surfactants is described by V. A. Davis, et al., in "Phase Behavior and Rheology of SWNTs in Superacids," *Macromolecules,* 2004, Vol. 37, pp. 154-160, also incorporated herein by reference in its entirety.

Long thread or worm like liquid crystals can also function as drag reducers while conducting operations in wellbores and/or subterranean formations and reservoirs, production tubing or pipelines as they reduce the turbulence in the annuli and pipe. Although different from the methods described herein, the drag reduction properties of liquid crystals is reported in WO 2005/090851 A1, incorporated herein by reference in its entirety.

Liquid crystal elastomers are useful for harsh environments such at high pressure and high temperature (HPHT) encountered in drilling completion and production operations. The high mechanical stress and strain, as well as their elasticity, make these materials desirable for equipment used in drilling completion and production. These elastomers combine the orientational ordering and phase transitions properties of liquid crystal systems and the rubbery elasticity of polymer network.

As described, the liquid crystals may be pre-formed, that is, formed on the surface within the fluid or then added to the fluid which is then pumped down-hole. Alternatively or additionally, the liquid crystals may be formed in situ adjacent to or within the wellbore or the subterranean formation. In the former situation the liquid crystal may be pre-formed by self-organization of surfactants, polymeric surfactants, amphiphilic polymers, polymers, copolymers, graphite nano tubes, carbon nano tubes, lipids, proteins and Janus molecules and particles or their mixtures thereof or by self-assembly of highly specific functional supramolecules including but not limited to "Janus like" liquid crystals. By "Janus like" is meant structures designed on a molecular level including molecules and/or particles having two different types of mesogenic units (e.g. hydrophilic/lipophilic) grafted onto the same scaffold to provide specific properties that may be reversed in response to certain external stimuli, By "highly specific functional" supramolecules it is meant self-assembling systems made up of multiple components that are not covalently bound together but associated by specific molecular interactions, such as hydrogen bonds, ionic bonds and charge-transfer interactions and have built into their structure the ability to perform selective processing. Functional supramolecules are designed incorporating certain functionality within a liquid crystalline molecule through covalent attachment to the mesogen unit of a given functional unit, which in general is not well adapted to being organized in nanoscale architectures. In the latter situation, it may be advantageous to form the LCs using a material already at or within the wellbore or subterranean formation or geothermal formation, for instance an oil or other hydrocarbon that may assist in forming the liquid crystals. However, aqueous fluids already present in the wellbore and/or subterranean formation may also be incorporated into the LCs. As noted, once formed, the LCs may be self-orienting or may be oriented by the downhole temperature.

Surfactants suitable for creating the pre-formed and/or in situ liquid crystals herein include, but are not necessarily limited to non-ionic, anionic, amphoteric and cationic surfactants as well as blends thereof. Co-solvents or co-surfactants such as alcohols are optional additives used in the liquid crystals formulation. Suitable nonionic surfactants include, but are not necessarily limited to, alkyl polyglycosides, sorbitan esters, polyglycol esters, methyl glucoside esters, alcohol ethoxylates, fluorocarbon surfactants and the like. Suitable amphiphilic copolymers are formed by combination of complex polymers, such as polyvinylpyridines, polyacrylic acids, polyethylene oxides (PEO), polyisoprenes, polycarbosilanes, polypropylene imines, polyamidoamines, polyesters, polysilicones, and polyphenylenevinylenes (PPV). Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates and mixtures thereof. Suitable cationic surfactants include, but are not necessarily limited to, arginine methyl esters, ester quats, alkanolamines and alkylenediamides. Suitable amphoteric surfactants include, but are not necessarily limited to, alkyl betaine, alkylamidopropyl betaine, sulfobetaines, aminopropionates, sultaines, imido propionic acids. Others suitable surfactants are dimeric or gemini surfactants, extended surfactants, silicone surfactants, Janus surfactants, cleavable surfactants and mixtures thereof. In one non-limiting embodiment at least two surfactants in a blend may be used to create the liquid crystals. "Cleavable surfactants" are a special class of surfactants with controlled half-lives that are rendered inactive by cleavage of some of their tailor-made weak chemical bonds, which break down either under acidic hydrolysis, alkaline hydrolysis or under the presence of ultraviolet light, in order to make the material compatible with a subsequent procedure, or in order to selectively remove the cleavage products, or in order to have the cleavage product impart a new function.

Extended surfactants, also called extended chain surfactants, may be defined as those containing a non-ionic spacer-arm central extension and an ionic or nonionic polar group. The non-ionic spacer-arm central extension may be the result of polypropoxylation, polyethoxylation, or a combination of the two, in non-limiting embodiments. In one non-limiting embodiment, the spacer arm may contain from 2 to 20 propoxy moieties and/or from 0 to 20 ethoxy moieties. Alternatively, the spacer arm may contain from 2 independently up to 16 propoxy moieties and/or from 2 independently up to 8 ethoxy moieties, where "independently" with respect to ranges herein means any combination of a lower threshold with an upper threshold. In a particular non-restrictive version, the spacer arm contains both propoxy and ethoxy moieties. The polypropoxy portion of the spacer arm may be considered lipophilic, however, the extended chain surfactant may also contain a hydrophilic portion to attach the hydrophilic group, which may generally be a polyethoxy portion, in one non-limiting embodiment having two or more ethoxy groups. These portions are generally in blocks, rather than being mixed, e.g. randomly mixed. It may be understood that the extended chain surfactant is an intramolecular mixture so that the extended chain surfactant achieves some gradual change from hydrophilic to lipophilic across the water/oil interface. Such surfactants help increase and thicken the interfacial region between the water and oil phases, which is desirable since this lowers interfacial tension and increases solubilization.

The lipophilic moiety of the extended surfactant may include C8 to C30 linear or branched hydrocarbon chains, which may be saturated or unsaturated. Carbon numbers as high as 30 for the lipophilic moiety may result if the moiety is highly branched, e.g. squalane, but in most cases may be no higher than C18. Suitable hydrophilic polar heads of the extended surfactant include, but are not necessarily limited to, groups such as polyoxyethylene (as described above), sulfate, ethoxysulfate, carboxylate, ethoxy-carboxylate, C6 sugar, xylitol, di-xylitol, ethoxy-xylitol, carboxylate and xytol, carboxylate and glucose. More details about extended chain surfactants may be found in U.S. patent application Ser. No. 12/414,888 filed Mar. 31, 2009, incorporated in its entirety by reference herein.

In many cases, the surfactant may be a surfactant blend with one of the above-noted surfactants and an optional co-surfactant, in which the co-surfactant is a short amphiphilic substance such as an alcohol having from 3 to 10 carbon atoms, alternatively from 4 to 6 carbon atoms (in non-limiting examples, n-propanol, n-butanol, iso-butanol, n-pentanol, hexanol, heptanol, octanol in their different isomerization structures) as well as glycols, and ethoxylated and propoxylated alcohols or phenols. In one non-restrictive embodiment the number of ethoxy units and/or propoxy units ranges from about 3 to about 15, alternatively from about 6, independently up to about 10. Alcohols are also noted herein as substances of intermediate polarity; that is, intermediate between non-polar substances such as oils and polar substances such as water.

In one non-limiting embodiment herein, the liquid crystals contain an optional non-polar liquid, which may include a synthetic fluid including, but not necessarily limited to, ester fluids; paraffins (such as PARA-TEQ™ fluids from Baker Hughes Drilling Fluids) and isomerized olefins (such as ISO-TEQ™ fluid from Baker Hughes Drilling Fluids). However, diesel and mineral oils such as ESCAID 110 (from Exxon) or EDC 99-DW oils (from TOTAL) and paraffin oils may also be used as a non-polar liquid in preparing the fluid systems herein.

Other optional, additional components include salts, acids, polymers, copolymers, organophilic clays, etc. With respect to the salts, it is expected that brine will be a common component of the fluids containing the liquid crystals, and any of the commonly used brines, and salts to make them, are expected to be suitable in the compositions and methods herein. The polymers and copolymers may be any of those conventionally known or to be developed which will increase the viscosity of the fluid and improve its ability to suspend solids. Suitable organophilic clay minerals include those whose surfaces have been coated with a chemical to make them oil-dispersible. These include, but are not necessarily limited to bentonite and hectorite (plate-like clays) and attapulgite and sepiolite (rod-shaped clays) with oil-wetting agents during manufacturing. Suitable acids include any of those conventionally used, such as mineral acids used in acidizing procedures, including, but not necessarily limited to, hydrochloric acid, hydrofluoric acid, fluoroboric acid, as well as organic acids including, but not necessarily limited to acetic acid, formic acid, etc. Salts of all of these acids may also be used.

Non-limiting broad and narrow proportion ranges for the various components of the liquid crystal compositions are given in Table I:

TABLE I

PROPORTIONS OF LIQUID CRYSTAL COMPONENTS, WT %

| Component | Broad Range | Narrow Range |
|---|---|---|
| Water | 0-98 | 0-70 |
| Liquid crystal forming material (e.g. surfactant) | 2-99 | 5-99 |
| Co-surfactant(s) (optional) | 0.5-30 | 1-15 |
| Oil (optional) | 0-99 | 0-60 |
| Optional components (e.g. salt, acid, etc.) | 0-30 | 0-20 |

The presence of liquid crystal phases in a given system may be determined by several techniques including, but not necessarily limited to, polarizing optical microscopy, differential scanning calorimetry, low shear rate rheology, small-angle X-ray scattering, small angle neutron scattering and $^2H$ nuclear magnetic resonance replacing water by $D_2O$, among others. The existence of these phases and the type of phase will depend on many parameters including but not necessarily limited to, type, properties and proportion of the various components of the system and conditions of the environment such as temperature of the formation; therefore those with ordinary skills in the art of making liquid crystals would be able to design the system with the appropriate formulation and conditions to ensure that liquid crystal phases are present in the fluid. FIG. 1 herein is from Forgiarini et al., "Formulation of Nano-emulsions by Low-Energy Emulsification Methods at Constant Temperature" Langmuir 2001, 17, 2076-2083, incorporated herein by reference in its entirety, and shows a typical phase diagram of a surfactant-water-oil system where various liquid crystal, microemulsion and liquid phases coexist for different proportions of components, namely: $O_m$ isotropic liquid phase; $L_\alpha$ lamellar LC phase; D' shear birefringent liquid phase; Wm bluish liquid phase (microemulsion); W aqueous liquid phase, O oil phase; MLC multiple phase region including lamellar LC.

Figure 2:
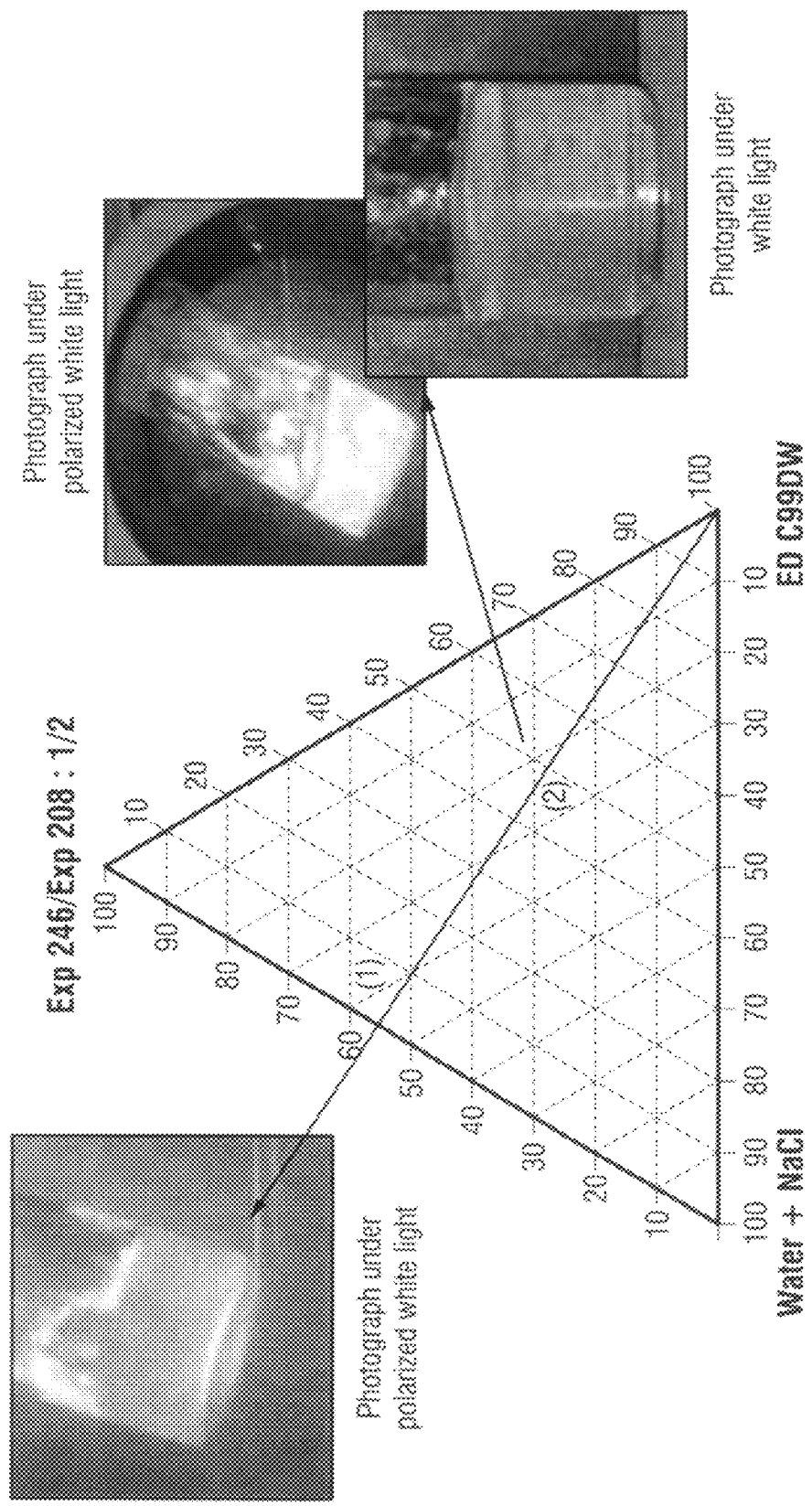
FIG. 2 is a phase diagram for a system of NaCl brine/EDC99DW oil and a 1:2 blend of surfactants EXP-246 and EXP-208.

FIG. 2 shows the presence of liquid crystal structures under polarized white light for a system containing two different proportions of a ratio of NaCl brine/EDC99DW oil and a 1:2 surfactant blend of EXP-246 and EXP-208 surfactants. The EXP-246 and EXP-208 surfactants are available from Baker Hughes Drilling Fluids.

Figure 3:
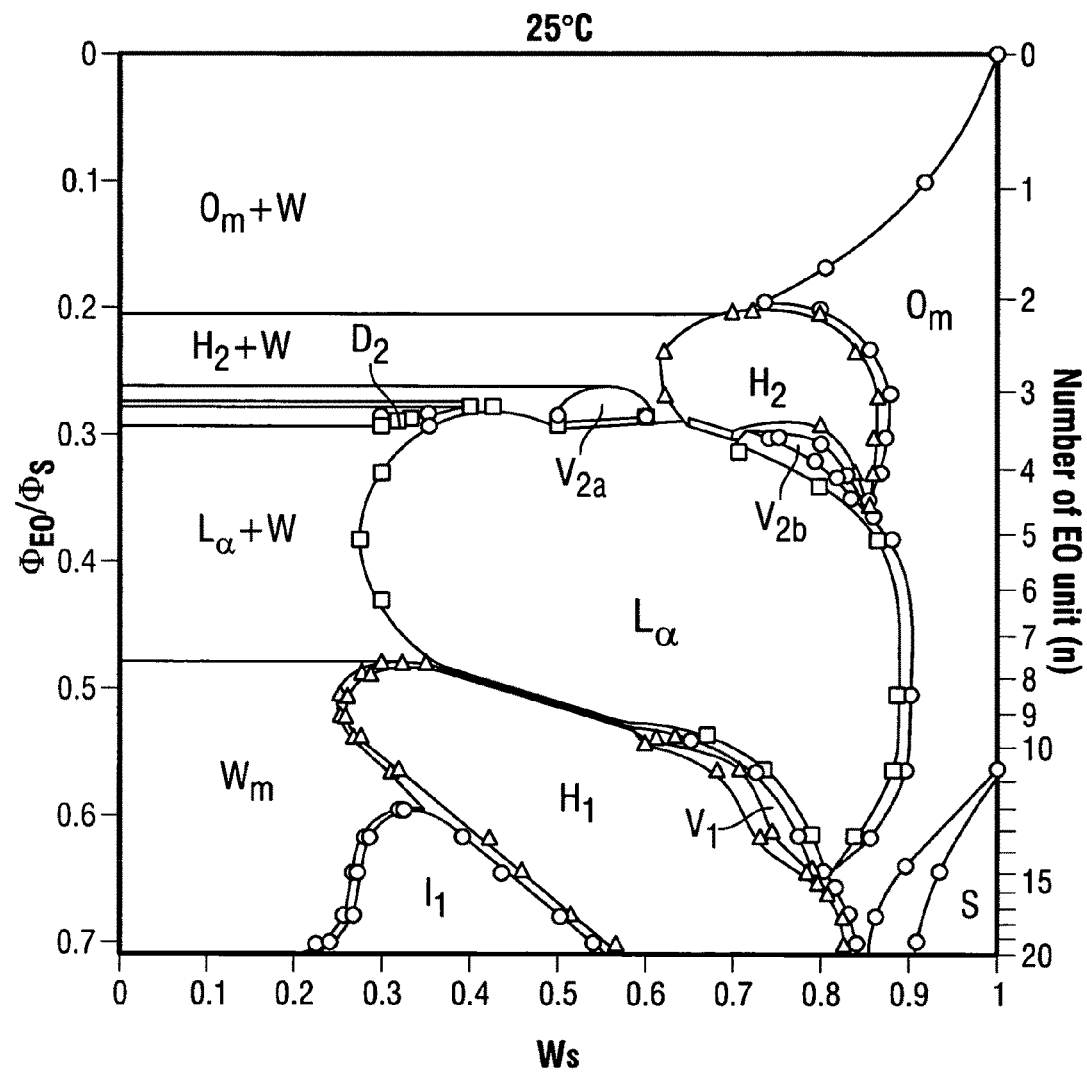
FIG. 3 is a binary water—surfactant phase diagram, showing the various liquid crystalline phases depending on the surfactant concentration and the proportion of ethoxylated units in the surfactant molecule.

FIG. 3 herein is from Kunieda et al., "Self-Organizing Structures in Poly (oxyethylene) Oleyl Ether—Water System" J. Phys. Chem. B 1997, 101, 7952-7957, incorporated herein by reference in its entirety, and shows the binary water—surfactant phase diagram where, depending on the surfactant concentration and the proportion of ethoxylated units in the surfactant molecule, various liquid crystalline phases namely hexagonal $H_1$, reverse hexagonal $H_2$, lamellar $L_-$, normal bicontinuous cubic $V_1$, reverse bicontinuous cubic $V_2$, coexists with isotropic bicontinuous surfactant (reverse type), aqueous phase containing surfactant aggregates, reverse micellar solution and excess water phases. Note that these phases are in the absence of a non-aqueous phase.

Figure 4:
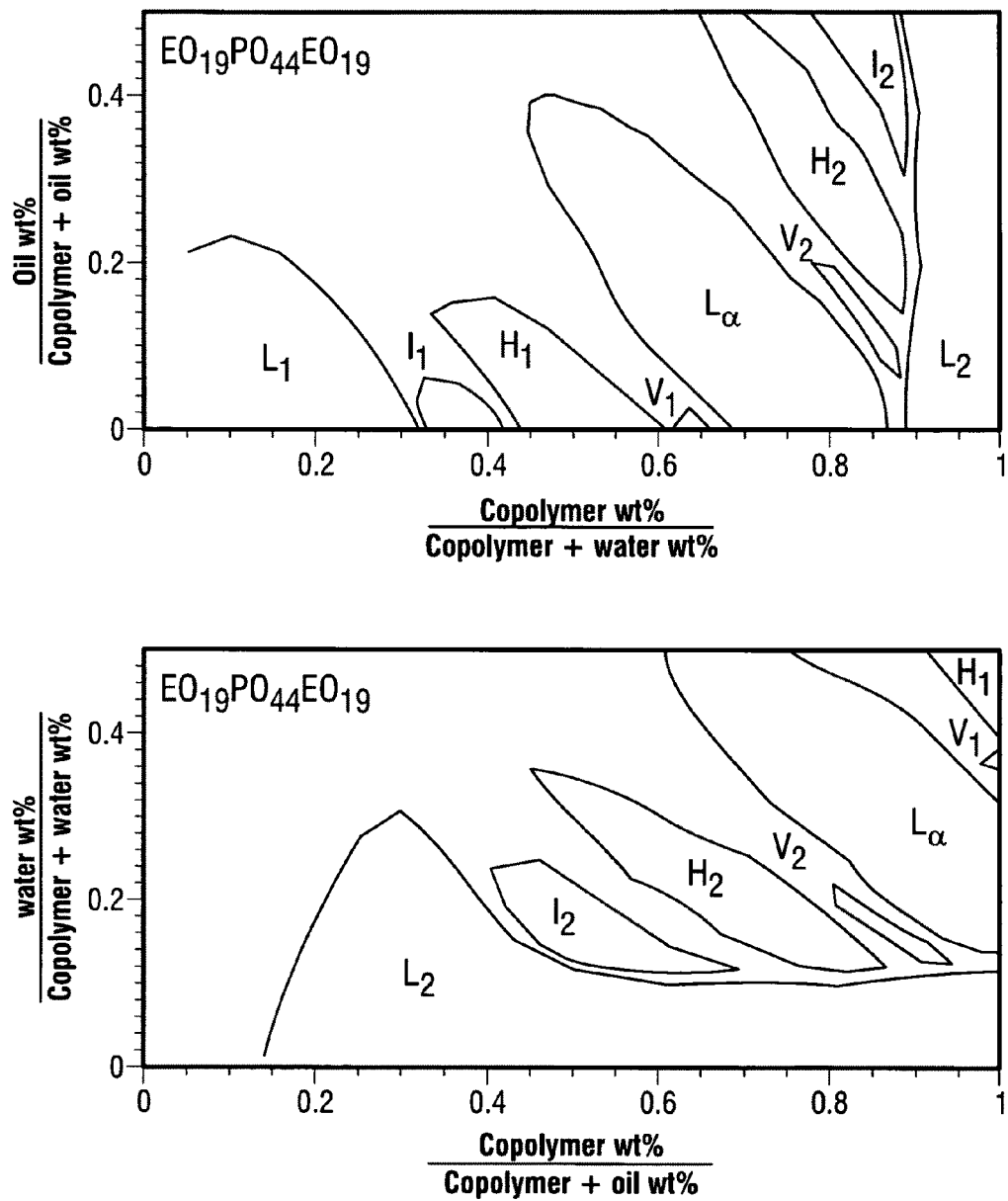
FIG. 4 shows the progression of liquid crystalline phases with increasing total copolymer content at the copolymer-water (oil-lean) and the copolymer-oil (water-lean) sides of a ternary copolymer-water-oil phase diagram.

FIG. 4 herein is from Alexandris, et al., "A Record Nine Different Phases (Four Cubic, Two Hexagonal, and One Lamellar Lyotropic Liquid Crystalline and Two Micellar Solutions) in a Ternary Isothermal System of an Amphiphilic Block Copolymer and Selective Solvents (Water and Oil)," Langmuir 1998, 14, 2627-2638 and shows the progression of liquid crystalline phases with increasing total copolymer content at the copolymer-water (oil-lean) and the copolymer-oil (water-lean) sides of a ternary copolymer-water-oil phase diagram. Depending on the proportion of copolymer in the system the structure resulting from the self-assembly of the copolymer can vary from normal micellar $L_1$, reverse micellar $L_2$, normal micellar cubic $I_1$, reverse micellar cubic $I_2$, lamellar $L_\alpha$, normal hexagonal $H_1$, reverse hexagonal $H_2$, normal bicontinuous cubic $V_1$ and reverse bicontinuous cubic $V_2$.

The fluids containing liquid crystals as described herein may include, but not necessarily be limited to, drilling fluids, drill-in fluids, completion fluids, fracturing fluids, remediation fluids, lost circulation fluids (particularly for use in carbonate formations), fluids used in injection wells (including, but not necessarily limited to those used in wellbore construction and enhanced oil recovery operations), and fluids used in conjunction with recovering energy from a geothermal well. Consequently, the methods of using these fluids may include, but not necessarily be limited to, one or more of the following further actions, circulating the fluid in the wellbore, fracturing the subterranean formation, removing damage and/or solids from the and/or subterranean formation, drilling the wellbore, release of an additive into a wellbore, reducing fluid loss into the formation, controlling trapped annular pressure, selectively gelling an oil layer in oil/water mixtures, reducing the production of water relative to the production of hydrocarbon, modifying the rheology of the fluid, reducing the drag of the fluid, lubricating moving (which includes rotating) equipment in the wellbore, removing heat from the drilling bit in particular and from the wellbore in general, strengthening the rock around the wellbore e.g. consolidation, improving the properties of cement in the wellbore (such as in a cementing operation), and/or delivering a fluid additive into the wellbore or subterranean formation.

U.S. Pat. No. 6,166,095 relates to methods of preparing a drilling fluid comprising structured surfactants involving a concentration sufficient to form a mobile G-phase which is a liquid crystal Lamellar Phase. This patent is incorporated by reference herein in its entirety. However, these methods require water soluble polyvalent metal salts of an alkyl ether acid, specifically an alkyl polyoxyalkylene sulfuric acid or carboxylic acid. The present methods and compositions have an explicit absence of these metal salts.

The methods and compositions herein may also be used to remove, heal, and/or remediate damage and other undesirable conditions caused by deposits of macromolecules from crude oils, such as the case of deposition of asphaltenes in the reservoir porous media. Other damage that may be removed includes any emulsions that incorporate or include any non-polar material (oil and other hydrocarbons) from the reservoir, or introduced as part of the drilling mud, as well as other substances injected downhole.

Thus, the methods and compositions herein have the advantages of reduced formation damage and/or remedying difficulties and/or damage in the wellbore during wellbore operations, and consequently increased hydrocarbon recovery, and/or increased water injection rate, as compared with an otherwise identical method and composition without liquid crystals including an optional acid or other component. Increased ability to suspend solids and/or reduced undesired fluid loss is expected using the liquid crystal-containing fluids of these compositions and methods herein as contrasted with otherwise identical fluids not containing the liquid crystals.

It will be appreciated that the amount of liquid crystals to be created or formed and the amounts of in situ-forming LC components (liquid crystal forming material(s)) and optional co-surfactant or polar and nonpolar components (if present) to be added or included in the fluids is difficult to determine and predict in advance with much accuracy since it is dependent upon a number of interrelated factors including, but not necessarily limited to, the brine type, the temperature of the formation, the particular surfactant or surfactant blend, type of polymer, copolymer or nanotube used, etc. Nevertheless, in order to give some idea of the quantities used, in one non-limiting embodiment, the proportion of liquid crystal in the fluid may range from about 1% up to about 85 volume %, even up to about 100 volume %, and in other non-limiting embodiments may range from about 1 to about 20 volume % in a diluted fluid.

Although water is expected to be the polar liquid used to make the fluids in situ, it will be appreciated that other liquids of intermediate polarity such as alcohols and glycols, alone or together with water, may be used. Non-aqueous liquid crystalline compositions may also be formulated as described by E. Friberg et al, "A Non-aqueous Microemulsion", *Colloid & Polymer Sci.* 262, 252-253 (1984), incorporated herein by reference in its entirety. For some applications, organic liquids may be expected to be used to make the liquid crystalline formulation. To be explicit, it should also be appreciated that the liquid crystals described herein may be present in a water-continuous emulsion, an oil-continuous emulsion and/or a bi-continuous emulsion. In the sense used in this paragraph, "emulsion" is defined to include all types of emulsions including, but not necessarily limited to macroemulsions, miniemulsions, microemulsions and nanoemulsions.

In another non-limiting embodiment, the salts suitable for use in creating the brine include, but are not necessarily limited to, ammonium chloride, sodium chloride, potassium chloride, calcium chloride, sodium bromide, calcium bromide, zinc bromide, sodium formate, potassium formate, cesium formate, magnesium chloride or acetate and combinations thereof. The density of the brines may range from about 8.4 lb/gal to about 15 lb/gal (about 1 to about 1.8 kg/liter), although other densities may be given elsewhere herein.

In one non-limiting embodiment, the fluids containing the liquid crystals have at least one improved property as compared with an otherwise identical fluid absent the liquid crystals. Such property may include, but is not necessarily limited to, increased viscosity, decreased fluid loss into the subterranean formation, increased lubrication, decreased flow pressure in the drill pipe and annuli, increased gelling of an oil layer, reduced drag of a fluid, increased wellbore strength, improved cement properties, and combinations of these properties.

Liquid crystal containing fluids may also be used to reduce trapped annular pressure during the hydrocarbon production process. When casing is cemented in oil and gas wells, fluids may become trapped in the annular space above the cement. During production, the near-wellbore temperature may increase from less than 100° F. (38° C.) to more than 200° F. (93° C.). This change in temperature causes the trapped fluids to expand and may create sufficient pressure to collapse or burst casing and/or tubing strings. Due to the high cost of intervention to repair damage from thermal expansion, several methods to compensate for this fluid expansion have been used or investigated. Previous mitigation techniques include insulated tubing, heavy walled casing, nitrogen-based spacers, burst disks, and crushable foam. Liquid crystals may be designed to produce a fluid that shrinks or contracts as temperature increases. A fluid containing liquid crystals or their components may be pumped as a spacer, downhole ahead of the cement. Once the spacer and cement have been pumped into place in the annulus, the change in the type of self organized structure and mesophase sequence of the liquid crystal will result in a reduction in volume, thereby offsetting thermal expansion of the fluid.

Hydrocarbon production may also be increased by the use of submersible pumps. The efficiency, life, and heat dispersion of the submersible pump are an important to the production operation. Liquid crystals may be designed to provide high degree of lubrication, reducing the heat load and increasing the life of the submersible pump.

Sealed bearing drill bits require excellent lubrication of the roller cone bearings. Because drilling fluid can enter around the seals, liquid crystal lubricants can be designed to maintain lubrication even after contamination with drilling fluid.

The production of water along with hydrocarbon can make a production well unprofitable and contribute to pollution and waste disposal costs. Water production can often occur as soon as production begins. A method to prevent or reduce water production would be the use of a liquid crystal that changes to high viscosity to physically block water movement when water encountered while allowing the oil to flow.

Water production usually occurs or increases as the production matures. It is therefore desirable to prevent the production of water. A method to prevent or reduce water production would be the use of a liquid crystal that changes to an LC electrical "switch" that can be used to close a mechanical valve on a downhole device when water changes the conductivity, or other property of the switch.

Self-responsive or "smart" fluids are those which change structure in response to one or more stimulus as previously described, these may include, but are not necessarily limited to, fluids to improve control of loss circulation, fluids to control trapped annular pressure (as previously described), the selective gelation of an oil layer in oil/water mixtures in waste management process (for instance to permit retrieval or removal of the oil easier and more complete), and mechanisms to plug watered-out zones while allowing the oil to flow. Such self-responsive or smart fluids are liquid crystals built by various types of interactions (e.g. hydrogen bonding, charge transfer and ionic bonds) to form complex functional and mechanical structures that respond to external stimuli, resulting in changes of the shape, size and properties of the materials. For example, in the case of plugging watered-out zones while permitting oil flow, the liquid crystals may swell in contact with water and shrink in contact with oil.

Liquid crystal lubricants are expected to include LC molecules which can form surface-aligned ordered layers. Such LCs exhibit fast and reversible transitions from low viscosity fluids to a highly viscous ordered liquid crystal phase in response to changes in pressure and shear. The rheological behavior of LCs has been evaluated for slide bearing lubricants due to their low friction coefficients.

It is further expected that well strengthening may be provided by ultra-thin effective membranes which are bi-layer liquid crystals, sealing off the near-wellbore zone. Such membranes are also expected to be useful in improving the properties of cement, such as adherence.

Liquid crystal, e.g. liquid crystal polymers, may also be formed in situ adjacent to the wellbore and/or the subterranean formation by putting in contact a suitable monomer and a liquid crystalline solution designed in a way that the polymerization process takes place at the wellbore conditions including pressure, temperature and appropriate fluid dynamics to ensure the formation of a bonded network of highly stiff fibers within the formation matrix.

Liquid crystals are also expected to be employed for encapsulation and controlled release of additives at remote locations including, but not limited to, the delivery of additives downhole or in a pipeline. The additives may be liquids and/or solids. Cross-linking agents may be used to engineer a set-time for loss circulation pills. LCs may also be used in the controlled release of production additives. Such LC carriers may be designed to become disordered in response to a given stimulus, such releasing the additives selectively at the location of interest.

Fluids containing liquid crystals may exhibit superior bit cooling properties of the drilling bit since the self organized system can be designed in a way that changes in molecular order/disorder due to a thermal stimuli favor the heat absorption-release process.

High performance materials may include organized polymers LC, which may include the synthesis of materials (e.g. elastomers) using LC technology to enhance mechanical properties due to the ordered molecules. Such structures may be engineered to withstand high mechanical stresses and strains and HPHT conditions. They may be lightweight and may form elastic coatings or elastomers.

Fluids containing liquid crystals may also increase the rate of penetration (ROP) of a drill bit in response to an electric field or magnetic field located at or near the drill bit. Liquid crystals in the drilling fluids may also increase ROP by reducing balling.

Liquid crystal formation could be used to disperse nanoparticles for applications in the oil industry. Dierking, I, Scalia, G. and Morales, P "Liquid crystal-carbon nanotube dispersions", Journal of Applied Physics 97, 044309 (2005), describes the parallel alignment of nanotubes obtained by dispersion in a self-organizing anisotropic fluid, such as a nematic liquid crystal. For the methods and compositions described herein, nanoparticles are defined as particles having an average particle size of 100 nm or less.

The invention will be further described with respect to the following Examples which are not meant to limit the invention, but rather to further illustrate the various embodiments.

EXAMPLES

Formulations of liquid crystals were prepared with EXP-293 and EXP-208 surfactants and evaluated at various salt ($CaCl_2$) concentrations. EXP-293 and EXP-208 are surfactants available from Baker Hughes Incorporated.

Table II shows three formulations. Each one was evaluated at various $CaCl_2$ concentrations. The total concentration of liquid crystal forming material was maintained at 25% in all formulations.

TABLE II

Formulations of Liquid Crystal Formulations

| Component of liquid crystal A | LC formulation 1 | LC formulation 2 | LC formulation 3 |
|---|---|---|---|
| Liquid crystal forming material: EXP-293, % by wt | 17.5 | 12.5 | 7.5 |
| Liquid crystal forming material: EXP-208, % by wt | 7.5 | 12.5 | 17.5 |
| $CaCl_2$, % by wt | 1-5 | 1-5 | 1-5 |
| Water, % by wt | 70-74 | 70-74 | 70-74 |

Viscosities for each formulation were measured at different temperatures and salt concentrations. Table III shows the viscosity measured at 0.01 1/s shear rate in liquid crystal formulations with various calcium chloride concentrations The rheological properties of the liquid crystals were affected by the temperature and salt concentration. The viscosity of the sample increased with increasing salt concentration; however, there is an optimum concentration for each respective formulation at which the sample is most viscous.

TABLE III

Viscosity of Liquid Crystal Formulations Measured at 60° C.

| CaCl$_2$ concentration in LC formulation | Viscosity at 0.01 1/s shear rate, cP | | |
|---|---|---|---|
| | LC formulation 1 | LC formulation 2 | LC formulation 3 |
| 1 | 800 | 580 | 500 |
| 5 | 180,000 | 250,000 | 350,000 |
| 10 | — | 360,000 | 2,200,000 |
| 15 | — | 600,000 | 425,000 |

Figure 5:
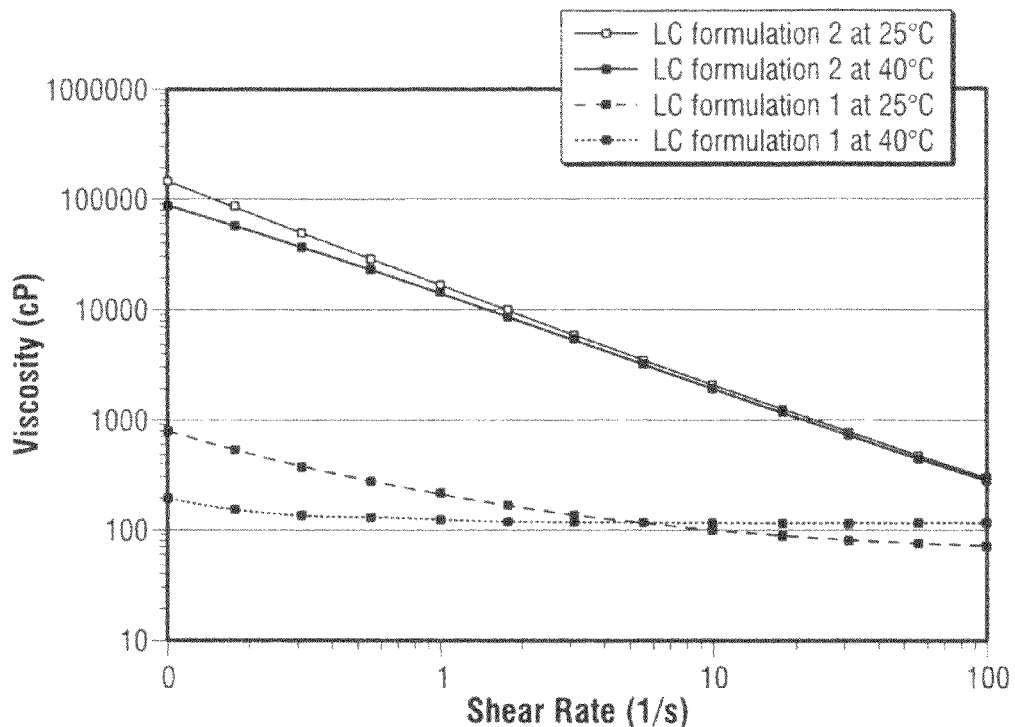
FIG. 5 is a graph of the rheology of liquid crystal formulations 1 and 2, viscosity as a function of shear rate, measured at various temperatures.

Tests of contamination of liquid crystal formulation with a 12.5 lb/gal (1.5 kg/liter) OBM were performed to evaluate the effect of contamination on the rheology. FIG. 5 shows the rheological properties of formulations 1 and 2 with 1% calcium chloride and contaminated with 10% of the 12.5 lb/gal (1.5 kg/liter) OBM. The rheology measured at 25° C. and 40° C. is presented in FIG. 5.

Figure 6:
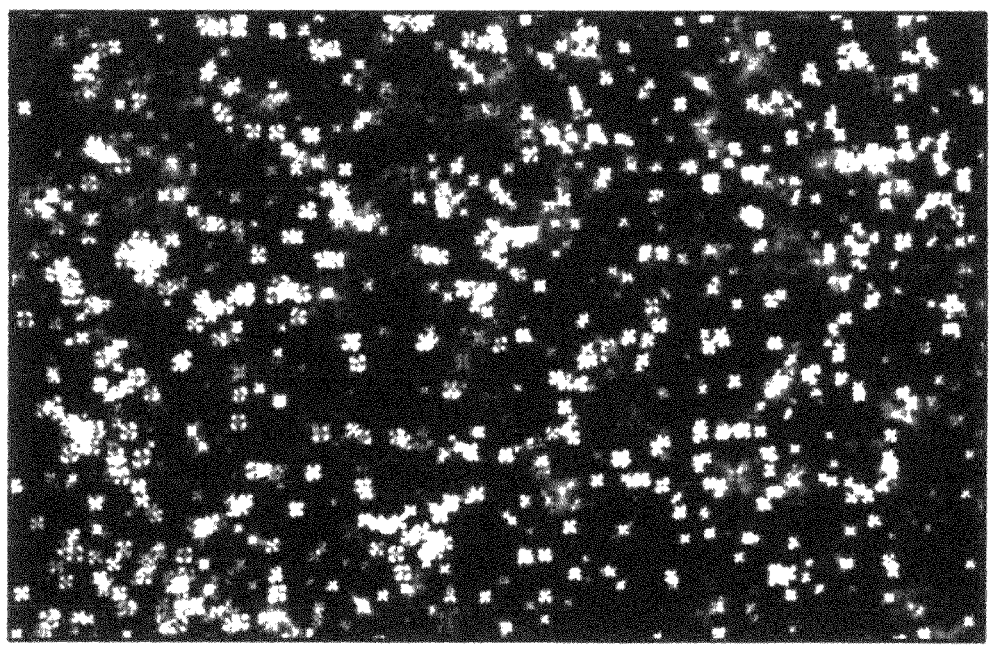
FIG. 6 is a polarized light microscopy image of liquid crystal formulation 2 showing the liquid crystal structure.

FIG. 6 shows a polarized light microscopy image of formulation 2 showing liquid crystal structure.

In the foregoing specification, the invention has been described with reference to specific embodiments thereof, and has been suggested as effective in providing effective methods and compositions for conducting a variety of operations in and on wellbores and subterranean reservoirs and formations. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of components and other components for forming the pre-formed or in situ liquid crystals, such as surfactants, co-surfactants, acids, solvents, nonpolar liquids, polar liquids (e.g. water or brine), polymers, copolymers, carbon nanotubes, etc. and proportions thereof falling within the claimed parameters, but not specifically identified or tried in a particular fluid to improve the ability to suspend solids and/or reduce fluid loss from a wellbore into a formation, are anticipated to be within the scope of this invention.

The present invention may suitably comprise, consist or consist essentially of the elements disclosed and may be practiced in the absence of an element not disclosed. For instance, the liquid crystals may consist essentially of or consist of an aqueous phase, a non-aqueous phase, and a liquid crystal-forming component selected from the group consisting of at least one surfactant, at least one polymer, at least one copolymer, nanotubes, and mixtures thereof. Additionally, the in situ liquid crystal-forming components may consist essentially of or consist of a component selected from the group consisting of an aqueous phase and a non-aqueous phase, and a liquid crystal-forming component as defined above or further in the claims.

The words "comprising" and "comprises" as used throughout the claims is to interpreted "including but not limited to".

What is claimed is:

1. A method of conducting an operation in a location selected from the group consisting of a wellbore, a subterranean formation, a reservoir, hydrocarbon production facilities, geothermal wells, and combinations thereof, the method comprising introducing a liquid crystal-containing fluid into the location, where the fluid comprises liquid crystals selected from the group consisting of:
  pre-formed liquid crystals which comprise:
    a component selected from the group consisting of an aqueous phase and a non-aqueous phase, and
    a liquid crystal-forming component selected from the group consisting of at least one surfactant, at least one polymer, at least one copolymer, nanotubes, and mixtures thereof; and
  in situ liquid crystal-forming components comprising:
    a component selected from the group consisting of an aqueous phase and a non-aqueous phase, and
    a liquid crystal-forming component selected from the group consisting of at least one surfactant, at least one polymer, at least one copolymer, nanotubes, and mixtures thereof, the method further comprising forming liquid crystals in situ adjacent the location;
      where the aqueous phase and non-aqueous phase may already be present in the location and the method further comprises introducing the in situ liquid crystal-forming components into the location.

2. The method of claim 1 further comprising at least one further action selected from the group consisting of:
  circulating the fluid in the wellbore;
  fracturing the subterranean formation;
  removing damage from a location selected from the group consisting of the wellbore and the subterranean formation;
  removing solids from a location selected from the group consisting of the wellbore and the subterranean formation;
  drilling the wellbore;
  releasing an additive into the wellbore;
  reducing fluid loss into the formation;
  controlling trapped annular pressure;
  selectively gelling an oil layer in oil/water mixtures;
  reducing the production of water relative to the production of hydrocarbon;
  modifying the rheology of the fluid;
  reducing the drag of the fluid;
  lubricating moving equipment in the wellbore;
  removing heat from the wellbore;
  crosslinking components of loss circulation pills;
  reversing an emulsifier with a magnetic field;
  increasing rate of penetration by response of the fluid to an electric field or magnetic field at a drill bit;
  dispersing nanoparticles;
  strengthening the wellbore;
  improving the properties of cement in the wellbore;
  delivering an additive into the wellbore or subterranean formation; and
  combinations thereof.

3. The method of claim 1 where the fluid has a property selected from the group consisting of increased viscosity, decreased fluid loss into the subterranean formation, increased lubrication, decreased flow pressure in a drill pipe and annuli and combinations of properties, increased gelling of an oil layer; reduced drag of a fluid; increased wellbore strength, improved cement properties, as compared with an otherwise identical fluid absent the liquid crystals.

4. The method of claim 1 where the surfactant is selected from the group consisting of:
  nonionic surfactants further selected from the group consisting of alkyl polyglycosides, sorbitan esters, methyl glucoside esters, alcohol ethoxylates, polyglycol esters, fluorocarbon surfactants, and amphiphilic copolymers;

anionic surfactants further selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates;

cationic surfactants further selected from the group consisting of arginine methyl esters, ester quats, alkanolamines and alkylenediamides;

amphoteric surfactants further selected from the group consisting of alkyl betaines, alkylamidopropyl betaines, sulfobetaines, aminopropionates, sultaines, and imido propionic acids; and dimeric or gemini surfactants, extended surfactants, silicone surfactants, Janus surfactants, cleavable surfactants; and combinations thereof.

5. The method of claim 1 where the liquid crystals further comprise:

from about 2 to about 99 wt % of the surfactant;
up to about 90 wt % water;
from 0 to about 30 wt % of a co-surfactant; and
up to about 99 wt % of an oil.

6. The method of claim 5 where the liquid crystals further comprise:

from about 5 to about 99 wt % of the surfactant;
up to about 70 wt % water;
from 0 to about 15 wt % of a co-surfactant; and
up to about 60 wt % of an oil.

7. The method of claim 5 where the oil is selected from the group consisting of synthetic oil, mineral oil, paraffin oil, diesel oil and combinations thereof.

8. The method of claim 1 where the liquid crystals further comprise from about 0.5 to about 30 wt % of a co-surfactant selected from the group consisting of an alcohol having from about 3 to about 10 carbon atoms.

9. The method of claim 1 where the liquid crystals further comprise up to about 30 wt % of an additional component selected from the group consisting of a salt, an acid, a polymer, a co-polymer, organophilic clay, and combinations thereof.

10. The method of claim 1 where the fluid is selected from the group consisting of drilling fluids, drill-in fluids, completion fluids, fracturing fluids, lost circulation fluids, injection fluids and fluids injected into geothermal wells.

11. The method of claim 1 where the nanotubes comprise carbon nanotubes.

12. The method of claim 1 where the pre-formed liquid crystal comprises supramolecules self-assembled from multiple components associated by molecular interactions selected from the group consisting of hydrogen bonds, ionic bonds, charge-transfer interactions, and combinations thereof.

13. The method of claim 1 further comprising changing the structure of the liquid crystal in response to a stimulus selected from the group consisting of pressure, temperature, pH, salinity, changes in ion concentration, electricity, magnetism and combinations thereof.

14. A method of conducting an operation in a location selected from the group consisting of a wellbore, a subterranean formation, a reservoir, hydrocarbon production facilities, geothermal wells, and combinations thereof, the method comprising:

introducing a liquid crystal-containing fluid into the location, where the fluid comprises liquid crystals selected from the group consisting of:

pre-formed liquid crystals which comprise:
a component selected from the group consisting of an aqueous phase and a non-aqueous phase, and
a liquid crystal-forming component selected from the group consisting of at least one surfactant, at least one polymer, at least one copolymer, nanotubes, and mixtures thereof; and in situ liquid crystal-forming components comprising:
a component selected from the group consisting of an aqueous phase and a non-aqueous phase, and
a liquid crystal-forming component selected from the group consisting of at least one surfactant, at least one polymer, at least one copolymer, nanotubes, and mixtures thereof, the method further comprising forming liquid crystals in situ adjacent the location;
where the aqueous phase and non-aqueous phase may already be present in the location and the method further comprises introducing the in situ liquid crystal-forming components into the location; and at least one further action selected from the group consisting of:
circulating the fluid in the wellbore;
fracturing the subterranean formation;
removing damage from a location selected from the group consisting of the wellbore and the subterranean formation;
removing solids from a location selected from the group consisting of the wellbore and the subterranean formation;
drilling the wellbore;
releasing an additive into the wellbore;
reducing fluid loss into the formation;
controlling trapped annular pressure;
selectively gelling an oil layer in oil/water mixtures;
reducing the production of water relative to the production of hydrocarbon;
modifying the rheology of the fluid;
reducing the drag of the fluid;
lubricating moving equipment in the wellbore;
removing heat from the wellbore;
crosslinking components of loss circulation pills;
reversing an emulsifier with a magnetic field;
increasing rate of penetration by response of the fluid to an electric field or magnetic field at a drill bit;
dispersing nanoparticles;
strengthening the wellbore;
improving the properties of cement in the wellbore;
delivering an additive into the wellbore or subterranean formation; and
combinations thereof, where the surfactant is selected from the group consisting of:
nonionic surfactants further selected from the group consisting of alkyl polyglycosides, sorbitan esters, methyl glucoside esters, alcohol ethoxylates, polyglycol esters, fluorocarbon surfactants, and amphiphilic copolymers;
anionic surfactants further selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates;
cationic surfactants further selected from the group consisting of arginine methyl esters, ester quats, alkanolamines and alkylenediamides;

amphoteric surfactants further selected from the group consisting of alkyl betaines, alkylamidopropyl betaines, sulfobetaines, aminopropionates, sultaines, and imido propionic acids; and dimeric or gemini surfactants, extended surfactants, silicone surfactants, Janus surfactants, cleavable surfactants; and combinations thereof; and where the liquid crystals further comprise:
from about 2 to about 99 wt % of the surfactant;
up to about 90 wt % water;
from 0 to about 30 wt % of a co-surfactant; and
up to about 99 wt % of an oil.

15. The method of claim 14 where the fluid has a property selected from the group consisting of increased viscosity, decreased fluid loss into the subterranean formation, increased lubrication, decreased flow pressure in a drill pipe and annuli and combinations of properties, increased gelling of an oil layer; reduced drag of a fluid; increased wellbore strength, improved cement properties, as compared with an otherwise identical fluid absent the liquid crystals.

16. The method of claim 14 where the liquid crystals further comprise:
from about 5 to about 99 wt % of the surfactant;
up to about 70 wt % water;
from 0 to about 15 wt % of a co-surfactant; and
up to about 60 wt % of an oil.

17. The method of claim 14 where the liquid crystals further comprise from about 0.5 to about 30 wt % of a co-surfactant selected from the group consisting of an alcohol having from about 3 to about 10 carbon atoms.

18. The method of claim 14 where the oil is selected from the group consisting of synthetic oil, mineral oil, paraffin oil, diesel oil and combinations thereof.

19. The method of claim 14 where the liquid crystals further comprise up to about 30 wt % of an additional component selected from the group consisting of a salt, an acid, a polymer, a co-polymer, organophilic clay, and combinations thereof.

20. The method of claim 14 where the fluid is selected from the group consisting of drilling fluids, drill-in fluids, completion fluids, fracturing fluids, lost circulation fluids, injection fluids and fluids injected into geothermal wells.

21. The method of claim 14 where the nanotubes comprise carbon.

22. The method of claim 14 where the pre-formed liquid crystal comprises supramolecules self-assembled from multiple components associated by molecular interactions selected from the group consisting of hydrogen bonds, ionic bonds, charge-transfer interactions, and combinations thereof.

23. The method of claim 14 further comprising changing the structure of the liquid crystal in response to a stimulus selected from the group consisting of pressure, temperature, pH, salinity, changes in ion concentration, electricity, magnetism and combinations thereof.

* * * * *